(12) United States Patent
Jacques et al.

(10) Patent No.: US 8,952,842 B2
(45) Date of Patent: Feb. 10, 2015

(54) HIGH-PRECISION, COMPACT ALTIMETRIC MEASUREMENT SYSTEM

(75) Inventors: Richard Jacques, Toulouse (FR); Nicolas Taveneau, La Salvetat Saint Gilles (FR)

(73) Assignee: Thales, Neuilly sur Seine (FR)

( * ) Notice: Subject to any disclaimer, the term of this patent is extended or adjusted under 35 U.S.C. 154(b) by 306 days.

(21) Appl. No.: 13/523,325

(22) Filed: Jun. 14, 2012

(65) Prior Publication Data
US 2013/0169472 A1    Jul. 4, 2013

(30) Foreign Application Priority Data

Jun. 17, 2011    (FR) .................................. 11 01859

(51) Int. Cl.
| | | |
|---|---|---|
| *G01S 13/08* | (2006.01) | |
| *G01S 7/40* | (2006.01) | |
| *G01C 5/00* | (2006.01) | |
| *G01J 1/56* | (2006.01) | |
| *G01S 13/86* | (2006.01) | |
| *G01S 13/88* | (2006.01) | |
| *G01S 13/00* | (2006.01) | |
| *G01S 7/00* | (2006.01) | |

(52) U.S. Cl.
CPC ............. *G01S 13/882* (2013.01); *G01S 7/4021* (2013.01); *G01S 13/86* (2013.01)
USPC ............. 342/120; 342/52; 342/118; 342/165; 342/173; 342/174; 342/175; 342/195; 342/350; 342/351; 342/352

(58) Field of Classification Search
USPC ........... 342/52, 118, 120–122, 165, 173–175, 342/195, 350–357.2, 25 R–25 F, 450, 458, 342/461; 73/178 R, 384; 374/1; 701/1, 3, 4; 356/432, 436, 437; 250/336.1, 338.1, 250/340, 342, 374, 385.1; 340/945, 971, 340/977, 978
See application file for complete search history.

(56) References Cited

U.S. PATENT DOCUMENTS

| | | | | |
|---|---|---|---|---|
| 2,573,823 | A | * | 11/1951 | Barghausen et al. ...... 250/385.1 |
| 3,056,958 | A | * | 10/1962 | Anderson ................... 250/338.1 |
| 3,364,485 | A | * | 1/1968 | Chiarello ...................... 250/342 |

(Continued)

FOREIGN PATENT DOCUMENTS

WO        2010/052530 A1    5/2010

OTHER PUBLICATIONS

Search Report of corresponding French Application No. 1101859 issued on Feb. 13, 2012.

*Primary Examiner* — Bernarr Gregory
(74) *Attorney, Agent, or Firm* — Baker & Hostetler LLP

(57) ABSTRACT

An altimetry system for a satellite, including an altimeter transmitting and receiving signals on at least one first frequency band; a radiometer receiving signals on at least one second frequency band, the altimeter and the radiometer being connected to one and the same antenna; reception means common to the altimeter and to the radiometer, and capable of amplifying and filtering the signals received from the antenna on a frequency band including the first frequency band and the second frequency band; means for separating the signals on the first frequency band from the signals on the second frequency band; the signals on the first frequency band being exploited to estimate an altimetric distance of the satellite, and radiometric measurements being exploited in order to correct the estimate.

10 Claims, 4 Drawing Sheets

(56) References Cited

U.S. PATENT DOCUMENTS

| | | | |
|---|---|---|---|
| 3,366,960 A * | 1/1968 | Gluck | 342/458 |
| 3,599,207 A * | 8/1971 | Foiani et al. | 342/52 |
| 3,706,988 A * | 12/1972 | Bayle et al. | 342/52 |
| 3,787,857 A * | 1/1974 | Lazarchik et al. | 342/351 |
| 3,836,966 A * | 9/1974 | Frisbee, Jr. | 342/120 |
| 3,921,169 A * | 11/1975 | Lazarchik et al. | 342/351 |
| 4,131,891 A * | 12/1978 | Stavis | 342/461 |
| 4,160,251 A * | 7/1979 | Lazarchik et al. | 342/351 |
| 4,347,515 A * | 8/1982 | Hoover, Jr. | 342/351 |
| 4,474,062 A * | 10/1984 | Gary | 73/178 R |
| 4,511,897 A * | 4/1985 | Lindner | 342/52 |
| 4,780,719 A * | 10/1988 | Frei et al. | 342/351 |
| 4,828,382 A * | 5/1989 | Vermilion | 342/120 |
| 5,175,555 A | 12/1992 | Holak et al. | |
| 5,189,424 A * | 2/1993 | Brown | 342/25 C |
| 6,256,559 B1 * | 7/2001 | Tsui | 701/4 |
| 6,366,835 B1 * | 4/2002 | Henderson | 701/4 |
| 6,439,763 B2 * | 8/2002 | Roeder et al. | 342/174 |
| 7,847,945 B2 * | 12/2010 | Gordley | 356/437 |
| 8,059,025 B2 * | 11/2011 | D'Addio | 342/120 |
| 2004/0145514 A1 | 7/2004 | Raney | |

* cited by examiner

HIGH-PRECISION, COMPACT ALTIMETRIC MEASUREMENT SYSTEM

CROSS-REFERENCE TO RELATED APPLICATIONS

This application claims priority to foreign French patent application No. FR 11 01859, filed on Jun. 17, 2011, the disclosure of which is incorporated by reference in its entirety.

FIELD OF THE DISCLOSURE

The present invention relates to a high-precision, compact altimetric measurement system. It makes it possible to reduce the complexity, the volume and the weight of the measurement system while retaining a very high level of precision. The invention applies notably to space altimetry, for the purpose of making it easier to carry the altimetric payload on dedicated satellites (specific altimetric satellites) or opportune satellites such as satellites with a main telecommunications mission in low orbit on which it is possible to install a secondary payload.

BACKGROUND

One objective of space altimetry is to measure the topography of the Earth's surface, that is to say the oceans, the ice caps and the land above sea level. Its principle is illustrated in FIG. 1. A satellite 101 determines on the one hand its precise altitude 111 relative to an Earth-surface reference point 105 (a terrestrial ellipsoid or geoid), by virtue of a precise positioning system (a GPS, DORIS, GLONASS or Galileo system), and on the other hand, the altimetric distance 112 by measuring the time taken by a signal to travel a distance there and back through the atmosphere 104 between the satellite 101 and the Earth's surface 102 (which may be the sea level). Knowing these two items of information 111, 112, the system deduces the height of the Earth's surface relative to the reference surface 105.

Such a satellite 101 is fitted with a payload dedicated to the altimetry measurements as illustrated in FIG. 2. This payload notably comprises the following instruments:
  an altimeter radar 201 which measures the altitude between the Earth's surface and the satellite 101;
  a system 203 for very precise positioning of the satellite (sometimes designated by the acronym "POD" for "Precise Orbit Determination") in relation to the reference stations on the ground (the DORIS system) or with reference satellites in orbit (GPS, GLONASS or Galileo systems) in order to be able to reference the topography of the Earth's surface in a terrestrial frame of reference;
  a radiometer 205 for correcting the propagation uncertainties due to the water-vapor content of the troposphere.

For very high-performance payloads, for example for measuring the topography of the oceans, the altimeter operates on two frequencies, typically Ku and C, in order to allow an effective correction of the effect of the ionosphere, that is on a single but very high frequency, usually in the Ka band, in order to reduce the effect of the ionosphere to a negligible level, the residual error being corrected by using models of the ionosphere the precision of which is then sufficient.

The abovementioned instruments usually take the form of instruments that are independent from one another, each comprising notably its own antenna, its own analogue processing modules, its own digital processing modules, its own power supply converters. The instruments thus constitute a bulky and heavy payload.

Techniques have been used to share the antenna between the altimeter and the radiometer. However, this simple sharing is found to be insufficient to significantly reduce the volume and the weight of the payload necessary for the altimetry mission.

SUMMARY

One object of the invention is to reduce the volume and weight of a payload capable of taking precise measurements of the topography of the Earth's surface. Accordingly, the subject of the invention is an altimetry system capable of being installed on board a satellite, the system comprising an altimeter transmitting and receiving signals on at least one first frequency band and a radiometer receiving signals on at least one second frequency band, the said altimeter and the said radiometer being connected to one and the same antenna, the system being comprising reception means common to the altimeter and to the radiometer, the said means being capable of amplifying and of filtering the signals received from the antenna on a frequency band comprising at least the first frequency band and the second frequency band and means for separating the signals of the first frequency band from the signals that are present on the second frequency band, the signals on the first frequency band being exploited in order to estimate the altimetric distance of the satellite, and the radiometric measurements being exploited in order to correct the said estimate of the uncertainty of tropospheric propagation.

The altimeter can transmit over several distinct frequency bands and the radiometer can also receive signals on several distinct frequency bands, the application of the altimetry system according to the invention being possible when at least one transmission frequency band of the altimeter is sufficiently close to the reception frequency band of the radiometer so that these close bands can be processed by common reception functions.

According to one embodiment of the altimetry system according to the invention, the reception means comprise a low noise amplifier operating on a frequency band comprising the said first frequency band and the said second frequency band.

According to one embodiment of the altimetry system according to the invention, the reception means comprise a band-pass filter capable of selecting a frequency band comprising the said first frequency band and the said second frequency band.

According to one embodiment of the altimetry system according to the invention, the said altimeter and the said radiometer are connected to the antenna via interconnection means comprising a function for isolating the transmission and reception channels, these interconnection means comprising a first circulator or group of circulators in series connected to a first port to the antenna, a second port of the said circulator or group of circulators being connected to a switch connected to the transmission channel of the altimeter, a third port of the said circulator or group of circulators being connected to a switch connected to the reception means common to the altimeter and to the radiometer.

According to one embodiment of the altimetry system according to the invention, the signal-separation means comprise a rejection filter for rejecting the first frequency band, the said filter being placed downstream of the common reception means.

According to one embodiment of the altimetry system according to the invention, the said first frequency band and the second frequency band are included in the Ka band.

According to one embodiment of the altimetry system according to the invention, the common reception means are connected to a first circulator connected via a first port to the isolation means, and connected via a second port to calibration means for calibrating the radiometer, the said calibration means comprising a hot source and a cold source configured to be connected alternately to the first circulator during the periods of calibration of the said radiometer.

According to one embodiment of the altimetry system according to the invention, the second frequency band is chosen so that its minimum boundary coincides with the maximum boundary of the first frequency band, or so that its maximum boundary coincides with the minimum boundary of the first frequency band.

A further subject of the invention is an altimetric payload for a satellite comprising a device for positioning the satellite relative to an Earth reference point and an altimetry system as described above.

A further subject of the invention is a method of altimetric measurement from a space satellite, the method comprising a step of radiometric correction, the method comprising a step of transmitting a signal to the Earth's surface, the method comprising at least the following steps:

calibrating the radiometer while waiting for the echo originating from the reflection from the ground of the transmitted signal;

receiving and processing the echo originating from the ground and concomitantly taking radiometric measurements at least some of which are made on a reception channel that is common to the channel for receiving the said echo.

BRIEF DESCRIPTION OF THE DRAWINGS

Other features will appear on reading the following detailed description that is given as an example and is not limiting and is made with respect to the appended drawings which represent.

DETAILED DESCRIPTION

Figure 1:
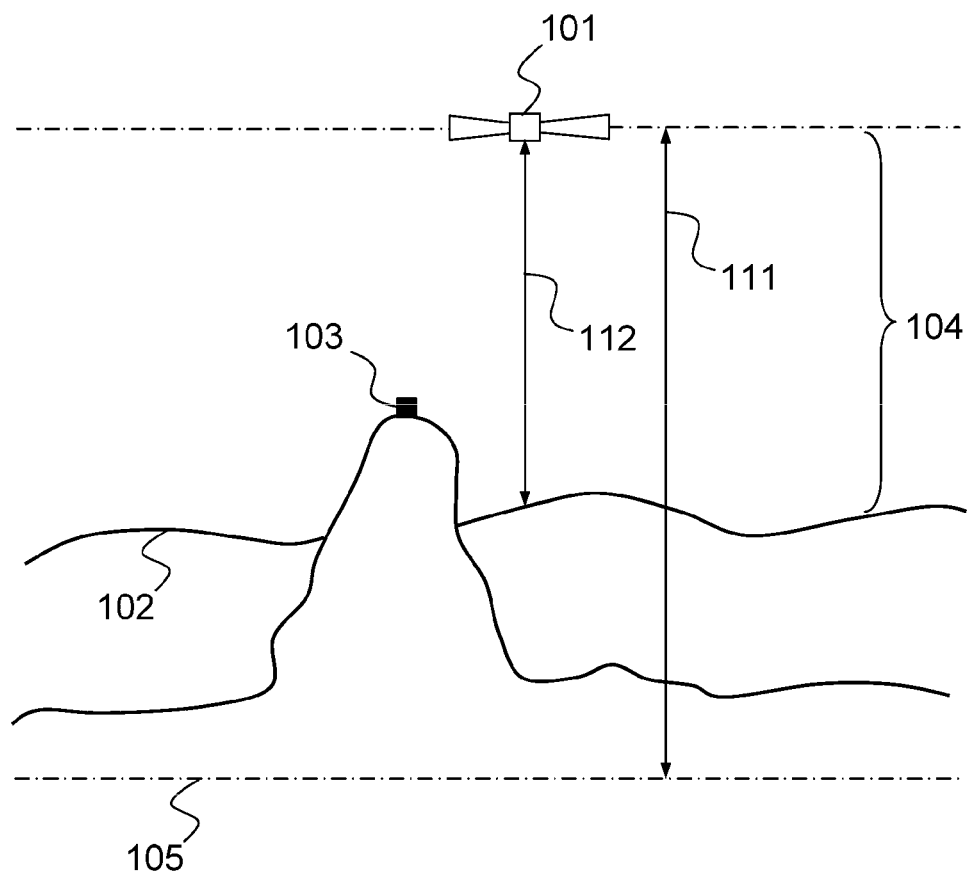
FIG. 1, an illustration of the principle of space altimetry, this figure already having been explained above.
Figure 2:
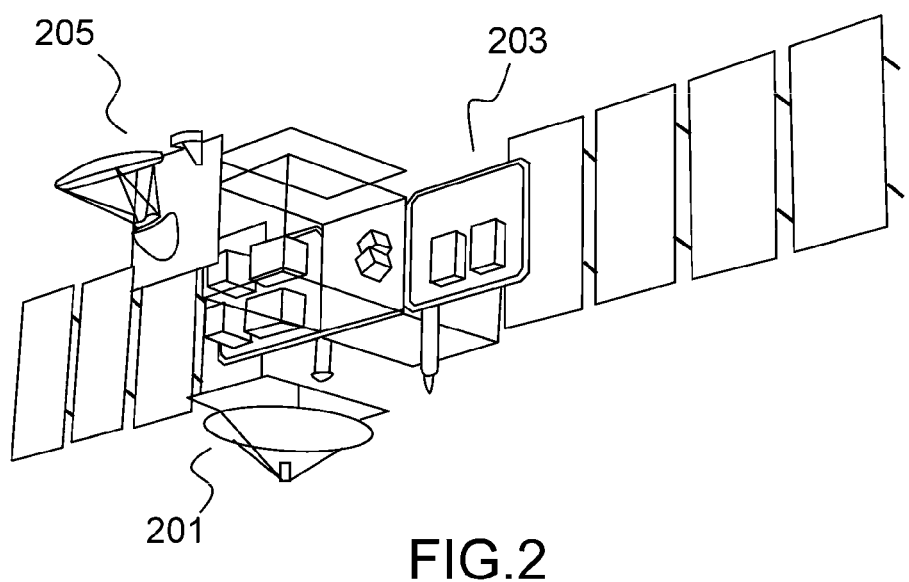
FIG. 2, a representation of a satellite comprising a payload with the conventional architecture, this figure already having been explained above.
Figure 3:
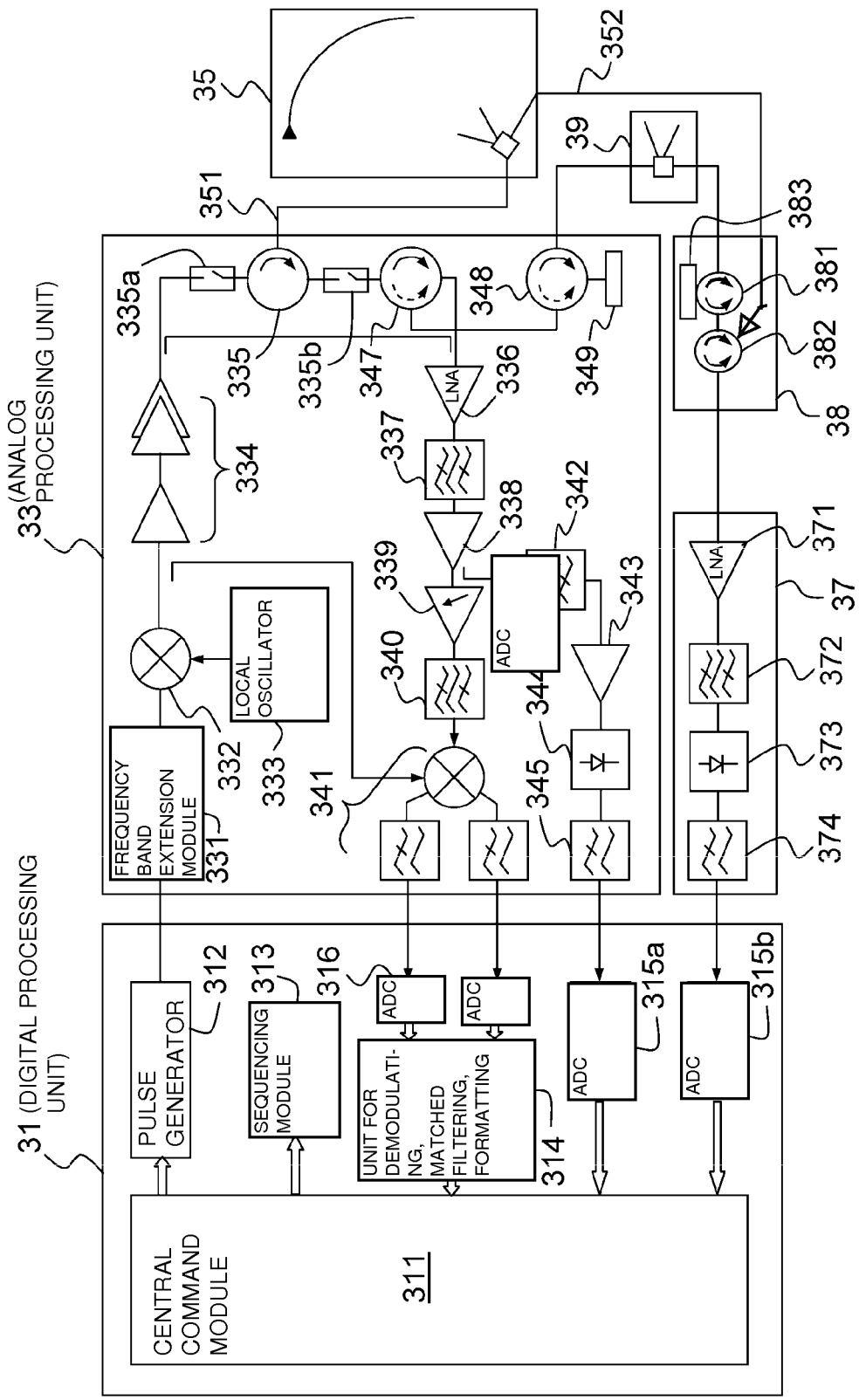
FIG. 3, an example of the architecture of a high-precision altimetric measurement system according to the invention.

FIG. 3 shows an example of the architecture of a high-precision altimetric measurement system according to the invention. The figure relates to an altimeter in the Ka band only which is particularly suitable for the application of the invention due to the closeness of the altimetric band to one of the radiometric bands. The system comprises a digital processing unit 31, an analogue processing unit 33 in the Ka band, an antenna 35, an analogue processing unit 37 in the K band comprising a calibration module 38, and a sky horn 39 used as a cold source of reference for the two channels of the radiometer.

Figure 4:
FIG. 4, a diagram illustrating a first example of frequency bands used by the altimetric measurement system according to the invention.

FIG. 4 illustrates in a diagram a first example of frequency bands used by the altimetric measurement system according to the invention. In the example, the altimeter function is designed to transmit and receive signals in only one frequency band 401 included in the Ka band. The radiometer takes noise measurements on two frequency bands suitable for the measurement of the water content incorporated over the height of the troposphere: a first band 411 in the K band, usually around 24 GHz, and a second frequency band 412 in the Ka band, usually around 37 GHz.

FIG. 3 will now be described. The notable roles of the digital processing unit 31 are to control the transmission of signals to the ground for the altimetric function, to appropriately acquire the echoes in order to estimate the altimetric distance based on the delay time measured between the transmitted signal and the echo (this estimate can be made either on board or on the ground based on the echoes that are sampled, digitized, averaged and retransmitted to the ground), and to collect the radiometric measurements originating from the K band analogue processing unit 37 and the Ka band analogue processing unit 33 in order to correct the estimate of distance with the radiometric measurements (this correction is made in a ground processing station). The digital processing unit 31 controls the analogue processing unit 33 in the Ka band which is not dedicated to a single function (altimeter or radiometer), but is capable of processing the analogue signals in the Ka band of the altimeter function and of the radiometer function. The notable roles of the analogue processing unit 33 in the Ka band is to generate and to transmit to the antenna 35 a transmission signal of a few watts for the altimetric function and then to process the signals received by the antenna 35 before transmitting them to the digital processing unit 31. The processing unit 37 in the K band is used only for the radiometric function. Its notable role is to process the signals received on the first band of the radiometer and then to transmit these signals amplified and filtered to the digital processing unit 31. This unit 37 comprises a calibration function 38 for calibrating the gain of the K band channel based on perfectly known noises delivered by a cold source 39 and a hot source 383. The calibration of the gain of the radiometer Ka channel is carried out according to the same principle as that of the K channel by virtue of the circulators 347, 348, at the hot source 349 and at the cold source 39 integrated into the analogue processing unit 33.

The digital processing unit 31 comprises a central command module 311 making it possible to initiate and to sequence the tasks executed by the digital processing unit 31, this central command module 311 being connected to a pulse generator 312, to a sequencing module 313 playing a precise timing role, to a unit 314 for the demodulation, matched filtering and formatting of the echoes and to analogue-digital converters 315a, 315b.

When the altimeter operates in transmission mode, the pulse generator 312 produces a "chirp", that is to say a pulse that is frequency-modulated linearly, for example on a band of approximately 30 MHz. This chirp is transmitted to a frequency band extension module 331 which, for example, broadens the band by a factor of 16 in order to modulate the chirp on a frequency band of 500 MHz in the example described. Then, frequency transposition means are used to transpose this modulated pulse in the Ka band. In the example, the chirp is transmitted to a mixer 332 powered by a local oscillator 333. The Ka band signal, usually of a few milliwatts, is amplified to a level of a few watts by the amplifier 334 and then transmitted to the antenna 35 via the port 351 in order to be transmitted by the antenna 35 to the Earth's surface. In the example, this altimetric sounding signal is transmitted on a band of 500 MHz that lies between 35.5 GHz and 36 GHz.

The antenna 35 is capable of operating in reception and in transmission mode. It comprises two ports 351 and 352 for processing the two K and Ka frequency bands. The first port 351 is connected to the analogue processing unit 33 and the second port 352 is connected to the analogue processing unit 37.

When the altimeter operates in reception mode, a signal received by the antenna 35 is transmitted via the first port 351 to a reception system of the Ka band analogue processing unit 33. In order to share the first port 351 of the antenna 35 for reception and transmission, switching means comprising a circulator 335 associated with two isolation switches 335a, 335b operating alternately are used. The isolation switches 335a, 335b are used to improve the blocking of the signals to the channel that is not activated (alternatively transmission and reception).

The signal received by the antenna 35 in reception mode is therefore transmitted via the circulator 335 and the isolation switch 335b (in the closed state) to reception means comprising a low noise amplifier 336 and a wide band selection filter 337. Advantageously, the signal originating from the wide band selection filter 337 is amplified 338 and then fed to two distinct branches: a first branch associated with the altimetric function and a second branch associated with the radiometric function.

The first branch comprises in turn a variable gain amplifier 339, an altimetric band selection filter 340, and then means 341 for correlation between the received signal (the echo originating from the reflection by the Earth's surface of the signal transmitted on the altimetric band) and the transmitted signal. The variable gain amplifier 339 is used to limit the power disparities of the echo, these disparities notably being due to the various natures of the reflection surfaces of the Earth (liquid ocean or ice, for example). The correlation means 341 mix a reference chirp (an exact replica of the chirp that has been used to generate the transmitted signal) obtained after the frequency transposition 332 with the filtered echo originating from the selection filter 340. At the output, these means deliver, in the case of a one-off target, a pure-frequency signal, the signal then being digitized 316 and then retransposed in the temporal domain by a Fourier transform so as to finally extract the delay time of the echo relative to the reference chirp. This delay is then used either on board (by the digital processing unit 31) or on the ground (in a ground processing station) in order to determine the altimetric distance. According to one embodiment, the correlation means 341 carry out a complex demodulation on two channels I and Q.

The second branch, associated with the radiometric function, comprises a rejection filter 342 of the altimetric band (in the example, the rejected band being between the frequencies 35.5 GHz and 36 GHz). Specifically, the radiometric function must not be disrupted by the echoes of the altimetric signals. The rejection filter 342 powers an amplifier 343, a square law detector 344 delivering a voltage proportional to the power of the received noise, and a low-pass filter 345 carrying out a first integration of the signal in order to obtain a mean value of the noise power. The measurement of the radiometer makes it possible to determine the corrections to be applied to the altimetric measurements in order to compensate for the imperfections due to crossing the ionosphere, these techniques furthermore being known to those skilled in the art.

Conventionally, a common altimeter/radiometer antenna according to the prior art has three distinct ports, namely one for each frequency band used, for example a first port for the band used by the altimeter, a second port for the first band used by the radiometer, and a third port for the second frequency band of the radiometer. In the system according to the invention, the two Ka band ports are combined into a single port 351 capable of transmitting the signals to be sent to the altimeter and to the radiometer for the adjacent frequency bands, a second port 352 being reserved for the noise measured on the second frequency band of the radiometer. One of the original features of the architecture of the system according to the invention is that the low noise amplification 336 and the filtering 337 are carried out on a wide frequency band covering both the frequency band used by the altimeter in the Ka band and the high frequency band of the radiometer, also being in the Ka band. This wide band filtering therefore notably makes it possible to save one additional port on the antenna 35, to economize on the use of a low noise amplifier (usually bulky) and to reduce the dimension of the calibration module 38 of the radiometer.

It should be noted that the calibration of the reception gain of the second channel of the radiometer (the one corresponding to the high frequency band of the radiometer, in the example around 37 GHz) is carried out cyclically (for example every second) by measuring known noise delivered by a cold source and by a hot source. For this, a first circulator 347 transmits to the reception system of the processing unit 33 in the Ka band, either the signal originating from the first port 351 of the antenna 35 (when in reception mode), or the measurement of the noise taken from a source of known temperature. The selected source of known temperature may be the cold source 39 or the hot source 349, a second circulator 348 being capable of selecting one or the other alternately.

The calibration module 38 of the radiometer comprises a first circulator 381 making it possible to connect either a cold source 39 or a hot source to a second circulator 382, which circulator is capable of connecting either the output of the first circulator 381, or the second port of the antenna 352 to the input of the K band processing unit 37 of the radiometer. Thus, the input of the processing unit 37 is powered by the signals originating from the second port 352 of the antenna 35 or by a hot source 383 or by a cold source 39 which may be for example a sky horn oriented towards the interstellar void the temperature of which is perfectly known. The hot source 383 may be an adapted load the temperature of which is precisely controlled.

The K band analogue processing unit 37 of the radiometer comprises in turn the calibration module 38, a low noise amplifier 371, an interest band filter 372, a square law detector 373 and a low-pass filter 374. According to another embodiment, the calibration module 38 is separated from the K band analogue processing unit 37.

The frequency values are given as an illustration and are not limiting; therefore, it is possible to envisage an altimeter operating at a frequency sufficiently close to that of an 18 GHz radiometer, for example at 17 GHz (the band authorized by the ITU, the International Telecommunications Union), so as to be able to produce a wide band receiver encompassing the signals on these two frequency bands.

The operating cycle of a system according to the invention may comprise in turn:
the transmission, for the altimeter part, of a signal to the Earth's surface;

the calibration of the radiometer during the time intervals not used for the transmissions or receptions of the echoes;

the reception and the processing of the echo originating from the ground and the concomitant production of radiometric measurements.

Advantageously, the exploitation of the echo delay time relative to the transmitted signal in order to estimate an altimetric distance and the correction of this estimate by using the radiometric measurements are operations carried out on the ground.

The architecture of FIG. 3 requires an interruption of reception when the altimetry signal is transmitted, the first isolation switch 335a being closed and the second isolation switch 335b being open. The radiometric measurements can be taken only outside these transmission periods. This cyclical interruption of reception on the Ka band causes a slight degradation of the radiometric resolution by a degradation factor that is inversely proportional to the square root of the reception duty factor, which is equal to the ratio of the reception period over the total period of the reception+transmission cycle. Thus, for a reception period equal to the transmission period, the duty factor is equal to 0.5 and the degradation factor is equal to the square root of 2.

Figure 5:
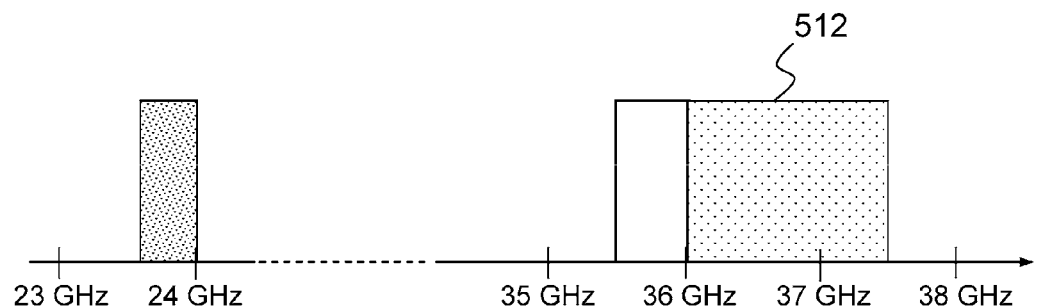
FIG. 5, a diagram illustrating a second example of frequency bands used by the altimetric measurement system according to the invention.

In order to compensate at least partly for this degradation, the system according to the invention may be configured to increase the radiometer noise band. In the example, instead of measuring the noise on a frequency band lying between 36.5 GHz and 37.5 GHz, the noise is measured between 36 GHz and 37.5 GHZ as illustrated in FIG. 5 (band 512). Therefore, the radiometric sensitivity is improved by a factor of the order of 25%.

Figure 6:
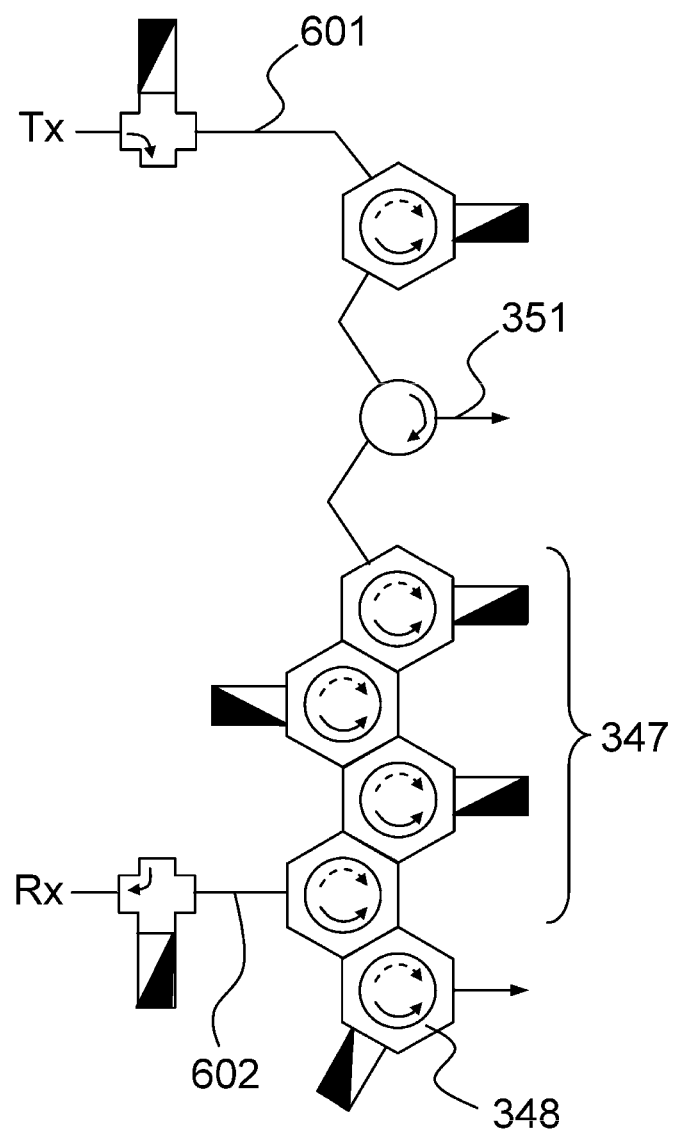
FIG. 6, a diagram representing an example of isolation means used to isolate the transmission channel of the altimetric function from the common reception channel of the system according to the invention.

FIG. 6 uses a diagram to show an example of isolation means used to isolate the transmission channel from the altimetric function of the common reception channel of the system according to the invention.

In the example, in order to obtain a good isolation between the transmission channel 601 and the common reception channel 602, four circulators are placed in series instead of the circulator 347 of FIG. 3, each circulator, in the open position, making it possible to attenuate a 20 dB signal.

Unlike a conventional system in which the altimeter and the radiometer are separate instruments, the architecture of the system according to the invention shares an antenna port and essential elements of the signal processing system, making the system much more compact and light than the earlier systems at an equivalent performance level.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. An altimetry system comprising:
   an altimeter transmitting and receiving signals on at least one first frequency band;
   a radiometer receiving signals on at least one second frequency band;
   an antenna connected to the altimeter and the radiometer;
   reception means common to the altimeter and to the radiometer, and capable of amplifying and filtering the signals received from the antenna on a frequency band comprising the first frequency band and the second frequency band;
   separation means for separating the signals on the first frequency band from the signals on the second frequency band; and
   a digital processing unit configured to exploit the signals on the first frequency band to generate an estimate of an altimetric distance of the satellite, and
   configured to exploit radiometric measurements of the second frequency band to correct the estimate,
   wherein the altimeter, the radiometer, the antenna, the reception means and the separation means are installed on board a satellite.

2. The altimetry system according to claim 1, wherein the reception means comprise a low noise amplifier operating on a frequency band comprising the said first frequency band and the said second frequency band.

3. The altimetry system according to claim 1, wherein the reception means comprise a band-pass filter capable of selecting a frequency band comprising the said first frequency band and the said second frequency band.

4. The altimetry system according to claim 3, further comprising interconnection means for connecting the altimeter and the radiometer to the antenna and for isolating the transmission and reception channels, the interconnection means comprising a first circulator including a first port connected to the antenna, a second port connected to a switch connected to a transmission channel of the altimeter, and a third port connected to a switch connected to the reception means common to the altimeter and to the radiometer.

5. The altimetry system according to claim 4, wherein the reception means are connected to a first circulator connected via a first port to the interconnection means, and connected via a second port to calibration means for calibrating the radiometer, the calibration means comprising a hot source and a cold source configured to be connected alternately to the first circulator.

6. The altimetry system according to claim 1, wherein the signal-separation means comprise a rejection filter for rejecting the first frequency band, from the signals amplified and filtered by the reception means.

7. The altimetry system according to claim 1, wherein the first frequency band and the said second frequency band are included in the Ka band.

8. The altimetry system according to claim 1, wherein a minimum boundary of the second frequency band coincides with a maximum boundary of the first frequency band, or a maximum boundary of the second frequency band coincides with a minimum boundary of the first frequency band.

9. An altimetric payload for a satellite comprising:
   a device for positioning the satellite relative to an Earth reference point; and
   an altimetry system comprising:
      an altimeter transmitting and receiving signals on at least one first frequency band,
      a radiometer receiving signals on at least one second frequency band,
      an antenna connected to the altimeter and the radiometer,
      reception means common to the altimeter and to the radiometer and configured to perform amplifying and filtering the signals received from the antenna on a frequency band including the first frequency band and the second frequency band, and
      separation means for separating the signals on the first frequency band from the signals on the second frequency band.

10. A method of altimetric measurement from a satellite, the method comprising a step of transmitting a signal from said satellite to the Earth's surface;

a step of calibrating a radiometer carried by said satellite, said step of calibrating being performed during time intervals not used for transmitting said signal or during waiting for an echo originating from a reflection of said signal from the Earth's surface;

a step of receiving, at the satellite, the echo;

a step of concomitantly taking radiometric measurements using said radiometer;

a step of processing said echo to generate an estimate of an altimetric distance of the satellite from the Earth's surface; and a step of correcting the estimate by exploiting said radiometric measurements, wherein at least some of said radiometric measurements are taken using a reception channel that is common to a reception channel for receiving the echo.

* * * * *